(12) United States Patent (10) Patent No.: US 8,255,135 B2
Marcigliano et al. (45) Date of Patent: Aug. 28, 2012

(54) CONTROL METHOD OF SHIFTING GEAR IN AN AUTOMATIC MANUAL TRANSMISSION HAVING A TWIN-CLUTCH GEARBOX

(75) Inventors: Francesco Marcigliano, Modena (IT); Davide Montosi, Formigine (IT)

(73) Assignee: Ferrari S.p.A. (IT)

( * ) Notice: Subject to any disclaimer, the term of this patent is extended or adjusted under 35 U.S.C. 154(b) by 110 days.

(21) Appl. No.: 12/755,274

(22) Filed: Apr. 6, 2010

(65) Prior Publication Data

US 2011/0087412 A1 Apr. 14, 2011

(30) Foreign Application Priority Data

Apr. 6, 2009 (IT) ................ B02009A0222

(51) Int. Cl.
*G06F 17/00* (2006.01)
*B60W 10/00* (2006.01)
(52) U.S. Cl. .......................... 701/67; 477/77
(58) Field of Classification Search .............. 701/67, 701/54, 68, 42; 74/331, 335; 477/77, 79, 477/107
See application file for complete search history.

(56) References Cited

U.S. PATENT DOCUMENTS

| 4,527,678 | A | 7/1985 | Pierce et al. | |
|---|---|---|---|---|
| 7,912,614 | B2* | 3/2011 | Honma et al. | 701/51 |
| 2006/0005649 | A1* | 1/2006 | Baldascini et al. | 74/335 |
| 2006/0111826 | A1* | 5/2006 | Akiyama | 701/48 |
| 2009/0069992 | A1 | 3/2009 | Preisner | |

FOREIGN PATENT DOCUMENTS

| DE | 10312399 A1 | 10/2003 |
|---|---|---|
| EP | 2042781 A1 | 4/2009 |
| WO | WO-03/074907 A2 | 9/2003 |

OTHER PUBLICATIONS

"European Application Serial No. 10159071.9, European Search Report dated Jun. 23, 2010", 5 pgs.
"Italian Application Serial No. ITB020090222, Italian Search Report completed Oct. 23, 2009", 2 pgs.

* cited by examiner

*Primary Examiner* — James P Trammell
*Assistant Examiner* — Muhammad Shafi
(74) *Attorney, Agent, or Firm* — Schwegman, Lundberg & Woessner, P.A.

(57) ABSTRACT

A control method of shifting gear in an automatic manual transmission having a twin-clutch gearbox to pass from a current gear to a successive gear, the control method including the steps of receiving a command of gear shifting, opening a first clutch associated with current gear, closing a second clutch which is associated with successive gear and starts transmitting a torque after a delay time interval from the start of the closing, and starting the opening of first clutch, thus decreasing the torque transmitted by first clutch itself before second clutch starts transmitting a torque, such that first clutch decreases the torque transmitted to the driving wheels before the second clutch starts transmitting a torque to the driving wheels.

10 Claims, 7 Drawing Sheets

CONTROL METHOD OF SHIFTING GEAR IN AN AUTOMATIC MANUAL TRANSMISSION HAVING A TWIN-CLUTCH GEARBOX

RELATED APPLICATION

This application claims the benefit of priority, under 35 U.S.C. Section 119, to Italian Patent Application Serial No. BO2009A 000222 filed on Apr. 6, 2009 which is incorporated herein by reference in its entirety.

TECHNICAL FIELD

The present invention relates to a control method of shifting gear in an automatic manual transmission having a twin-clutch gearbox.

BACKGROUND

An automatic manual transmission (commonly called "AMT") having a twin-clutch gearbox comprises a pair of primary shafts coaxial to each other, independent and fitted within each other; two coaxial clutches, each of which is adapted to connect a corresponding primary shaft to a drive shaft of a internal combustion thermal engine; and at least one secondary shaft which transmits the motion to the driving wheels and may be coupled to the primary shafts by means of corresponding pairs of clusters, each of which defines a gear.

During a gear shifting, the current gear couples the secondary shaft to a primary shaft while the successive gear couples the secondary shaft to the other primary shaft; consequently, the gear shifting occurs by crossing the two clutches, i.e., by opening the clutch associated with the current gear and simultaneously closing the clutch associated with the successive gear.

The clutches used in a twin-clutch gearbox are usually in an oil bath and are therefore operated under pressure (i.e., the degree of opening/closure of the clutch is determined by the oil pressure within the clutch itself). When a transmission control unit receives the command of gear shifting from the driver (the driver typically acts on a lever or button arranged on the steering wheel or in proximity of the steering wheel), the transmission control unit immediately starts closing the clutch associated with the successive gear; however, before the clutch associated with the successive gear may start transmitting a torque to the driving wheels, it is necessary to wait for a certain delay time interval (typically between 100 and 250 milliseconds) during which the filling of oil within the clutch is completed.

When the clutch associated with the successive gear starts transmitting a torque to the driving wheels (therefore at the end of the delay time interval) the clutch associated with the current gear is gradually opened by determining a crossing between the two clutches; it is worth noting that the opening of the clutch associated with the current gear occurs with no delay, as the clutch is already filled with oil under pressure and must be emptied of the existing oil. As the clutch associated with the successive gear increases the torque transmitted to the driving wheels, the clutch associated with the current gear complementary decreases the torque transmitted to the driving wheels so as to always keep both the torque generated by the combustion engine and the torque transmitted to the driving wheels constant.

It has been noted that the driver feels the presence of the delay (equal to the delay time interval) between the moment in which he/she generates the command of gear shifting and the moment in which he/she actually starts the gear shifting (i.e., the moment in which the clutch associated with the successive gear starts transmitting a torque to the driving wheels). Such delay, although being very limited and however not affecting the performance as the transmission of the torque to the driving wheels is never interrupted or decreased, is considered as annoying and detrimental by a substantial percentage of the drivers who wrongly believe that the traditional automatic manual transmission having a single clutch gearbox is quicker and therefore more high-performance.

Moreover, the average driver is used to the perceptions transmitted by a traditional single clutch gearbox and therefore expects to feel a "torque gap" (i.e., an "acceleration gap") during a forward gear shifting followed by an increase in engine torque (i.e., acceleration) at the end of the forward gear shifting. On the contrary, in a standard gear shifting of a twin-clutch gearbox, during a forward gear shifting there is only felt a gradual reduction of longitudinal acceleration $\alpha$ of vehicle 1 by effect of the gradual lengthening of the gear ratio of the engine torque generated by engine 4; such gear shifting mode is very positive in terms of performance, but makes the majority of drivers feel exactly the opposite, i.e., is considered as detrimental to the performance.

It is worth noting that the opinion expressed by the drivers must be taken into major account even when it is technically wrong, as the vast majority of the drivers buy cars according to their own perceptions and beliefs and not based on objective criteria. In other words, what matters most is not that the vehicle has actually high performance, rather the vehicle must be felt by the drivers as having high performance.

OVERVIEW

Examples described here provide a control method of shifting gear in an automatic manual transmission having a twin-clutch gearbox, wherein the control method is free from the above-described drawbacks and is simultaneously both easy and cost-effective to be implemented.

According to some examples, there is provided a control method of shifting gear in an automatic manual transmission having a twin-clutch gearbox as claimed in the attached claims.

BRIEF DESCRIPTION OF DRAWINGS

The present invention will now be described with reference to the accompanying drawings, which illustrate an exemplary and non-limitative embodiment thereof, in which.

DETAILED DESCRIPTION

Figure 1:
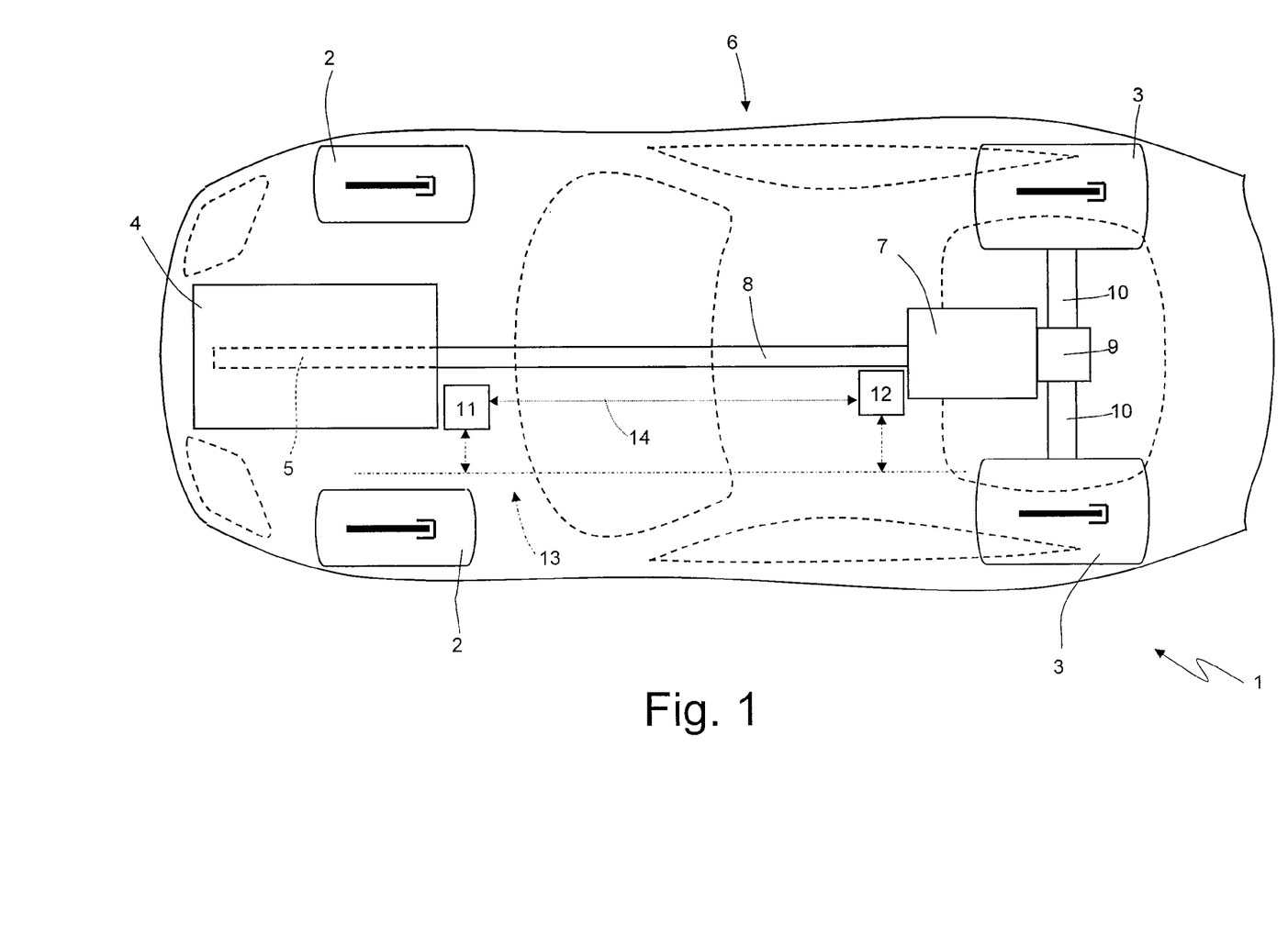
FIG. 1 is a schematic and plan view of a rear wheel drive vehicle provided with an automatic manual transmission which is controlled according to some control methods.

In FIG. 1, number 1 indicates as a whole a vehicle (specifically, a car) provided with two front wheels 2 and two rear driving wheels 3; an internal combustion engine 4 is arranged in front position and provided with a drive shaft 5, and produces an engine torque which is transmitted to rear driving wheels 3 through an automatic manual transmission 6. Transmission 6 comprises a twin-clutch gearbox 7 arranged in rear position and a drive shaft 8 which connects drive shaft 5 to an input of gearbox 7. A self-locking differential 9, from which a pair of differential shafts 10 exit (each of which is integral with a rear driving wheel 3) is connected in cascade to gearbox 7.

Vehicle 1 comprises a control unit 11 of engine 4 which monitors the control of engine 4, a control unit 12 of transmission 6 which monitors the control of transmission 6, and a BUS line 13 which is made according to the CAN (Car Area Network) protocol, is extended to the whole vehicle 1 and allows control units 11 and 12 to communicate with each other. In other words, control unit 11 of engine 4 and control unit 12 of transmission 6 are connected to BUS line 13 and may therefore communicate with each other by means of messages sent over BUS line 13. Moreover, control unit 11 of engine 4 and control unit 12 of transmission 6 may be directly connected to each other by means of a dedicated synchronization cable 14 which is able to directly transmit a signal without the delays introduced by BUS line 13 from control unit 12 of transmission 6 to control unit 11 of engine 4.

Figure 2:
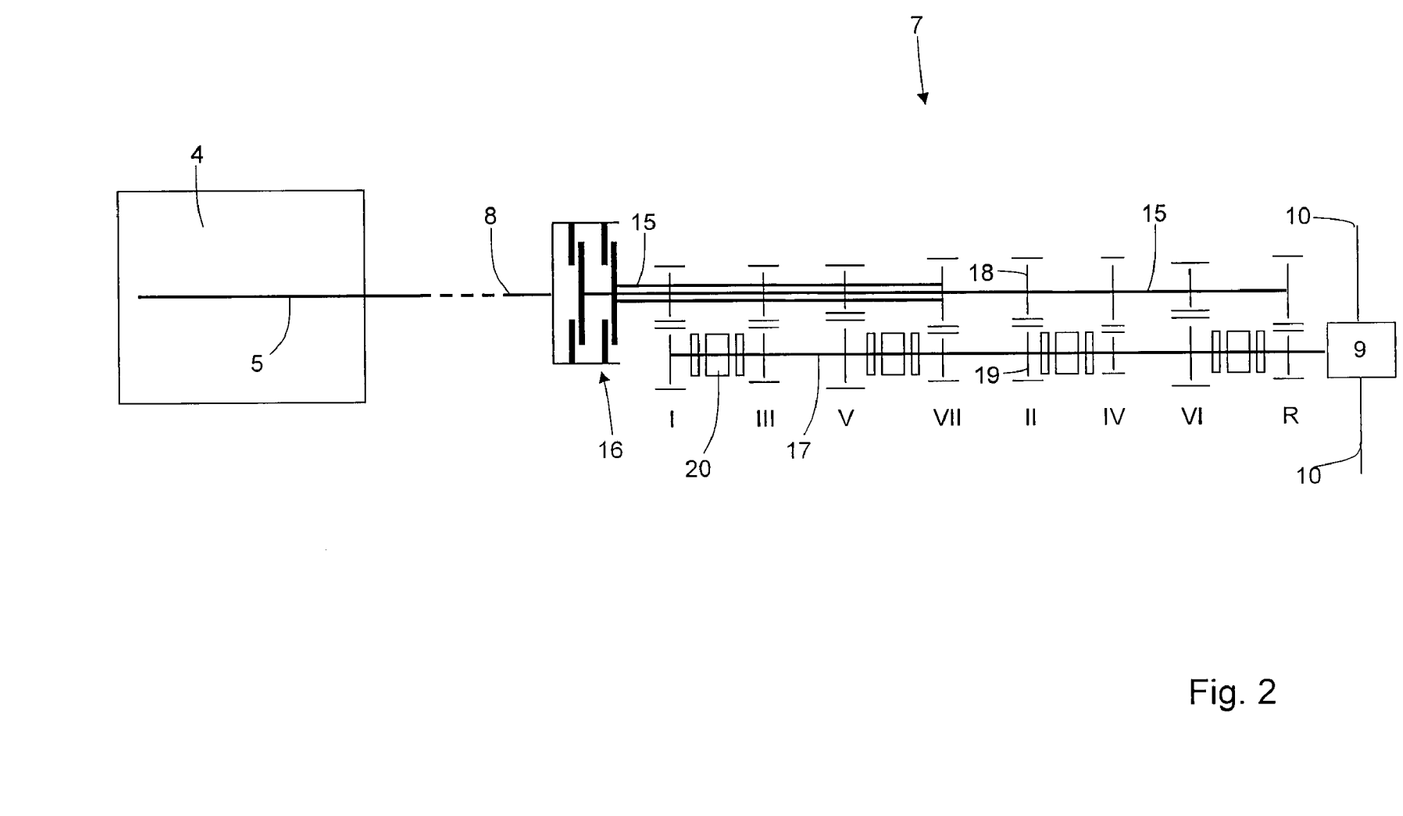
FIG. 2 is a schematic view of the automatic manual transmission in FIG. 1 provided with a twin-clutch gearbox.

As shown in FIG. 2, twin-clutch gearbox 7 comprises a pair of primary shafts 15 coaxial with each other, independent and fitted within each other. Moreover, twin-clutch gearbox 7 comprises two coaxial clutches 16, each of which is adapted to connect a corresponding primary shaft 15 to drive shaft 5 of internal combustion engine 4 by means of interposition of drive shaft 8; each clutch 16 is in an oil bath and is therefore controlled under pressure (i.e., the degree of opening/closure of clutch 16 is determined by the oil pressure within clutch 16 itself); according to an alternative embodiment, each clutch 16 is dry and is therefore controlled in position (i.e., the degree of opening/closure of clutch 16 is determined by the position of a mobile member of clutch 16 itself). Twin-clutch gearbox 7 comprises a single secondary shaft 17 connected to differential 9 which transmits the motion to rear driving wheels 3; according to an alternative and equivalent embodiment, twin-clutch gearbox 7 comprises two secondary shafts 17 both connected to differential 9.

Twin-clutch gearbox 7 has seven forward gears indicated by Roman numerals (first gear I, second gear II, third gear III, fourth gear IV, fifth gear V, sixth gear VI and seventh gear VII) and a reverse gear (indicated by letter R). Primary shaft 15 and secondary shaft 17 are mechanically coupled to each other by means of a plurality of pairs of clusters, each of which defines a corresponding gear and comprises a primary cluster 18 fitted on primary shaft 15 and a secondary cluster 19 fitted on secondary shaft 17. In order to enable the proper operation of twin-clutch gearbox 7, all odd gears (first gear I, third gear III, fifth gear V, seventh gear VII) are coupled to the same primary shaft 15, while all even gears (second gear II, fourth gear IV and sixth gear VI) are coupled to the other primary shaft 15.

Each primary cluster 18 is keyed to a corresponding primary shaft 15 for always rotating integrally with primary shaft 15 itself and permanently meshes with corresponding secondary cluster 19; on the contrary, each secondary cluster 19 is idly fitted on secondary shaft 17. Moreover, twin-clutch gearbox 7 comprises four double synchronizers 20, each of which is fitted coaxially with respect to secondary shaft 17, is arranged between two secondary clusters 19, and is adapted to be operated to alternatively engage the two corresponding secondary gears 19 with secondary shaft 17 (i.e., to alternatively make the two corresponding secondary clusters 19 angularly integral with secondary shaft 17). In other words, each synchronizer 20 may be moved towards a direction for engaging a secondary cluster 19 with secondary shaft 17, or it may be moved towards another direction for engaging the other secondary cluster 19 with secondary shaft 17.

The modes for performing a gear shifting from a current gear A to a successive gear B will be described below. For the sake of simplicity, a forward gear shifting during the gear progression will be described, so that actual gear A has a higher gear ratio than successive gear B.

In an initial situation (i.e., before the gear shifting), a clutch 16A is closed for transmitting the motion to a primary shaft 15A which in turn transmits the motion to secondary shaft 17 by means of gear A which is currently engaged; on the contrary, a clutch 16B is open and therefore isolates a primary shaft 15B from drive shaft 8. Before starting the forward gear shifting, successive gear B is engaged for connecting primary shaft 15B to secondary shaft 17 by means of gear B itself; such operation is performed automatically irrespective of the driver wishes as soon as clutch 16B is opened at the end of the previous gear shifting. When the driver sends the command of gear shifting, a gear shifting is performed by opening clutch 16A for disconnecting primary shaft 15A (consequently, gear A) from drive shaft 8 (i.e., from drive shaft 5 of engine 4) and simultaneously closing clutch 16B for connecting primary shaft 15B (consequently, gear B) to drive shaft 8 (i.e., to drive shaft 5 of engine 4).

Figure 3:
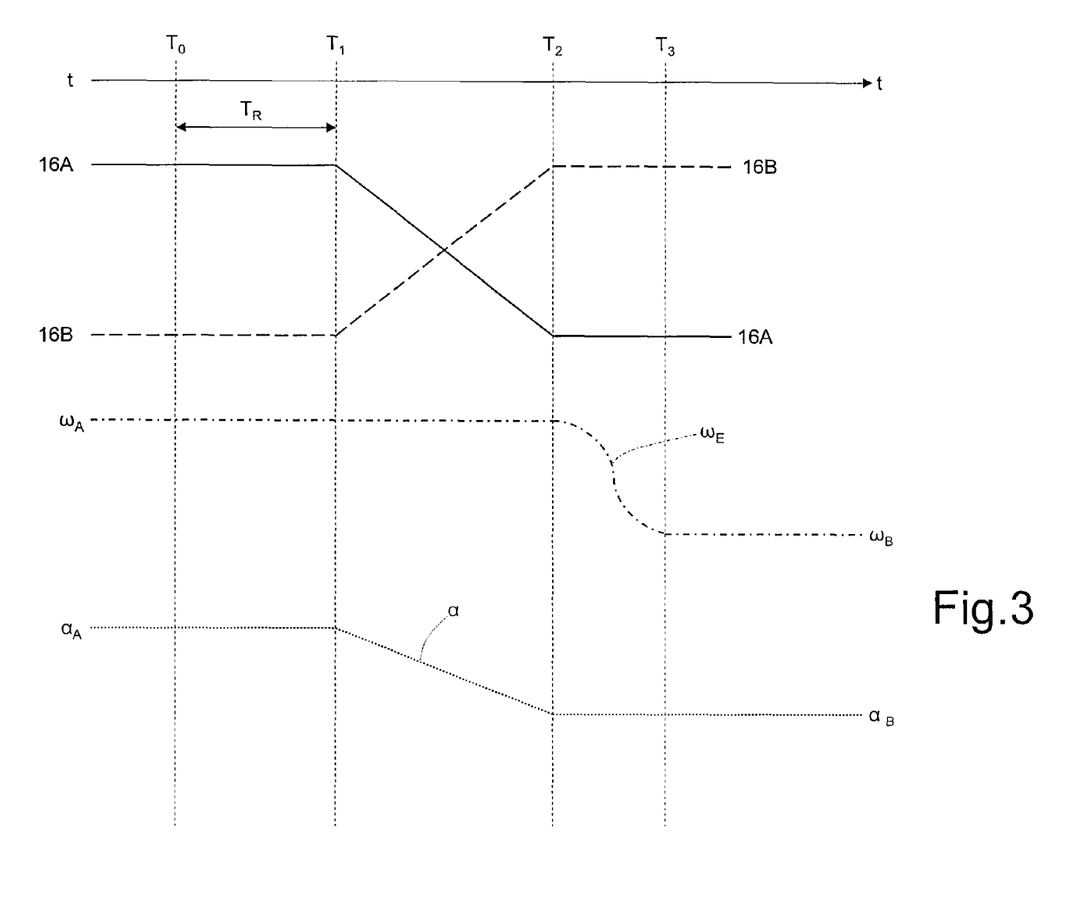
FIG. 3 shows the evolution in time of the torques transmitted by the two clutches of the twin-clutch gearbox, the rotation speed of a drive shaft of the engine, and the longitudinal acceleration of the vehicle during a gear shifting.

The modes for a conventional gear shifting is illustrated in FIG. 3, in which the driver sends the command of gear shifting (typically by acting on a lever or button arranged on the steering wheel or in proximity of the steering wheel) at moment $T_0$. As soon as transmission control unit 12 receives the command of gear shifting (moment $T_0$), transmission control unit 12 immediately starts closing clutch 16B associated with successive gear B; however, before clutch 16B associated with successive gear B starts transmitting a torque to rear driving wheels 3 it is necessary to wait for a certain delay time interval $T_R$ (typically between 100 and 250 milliseconds) during which oil filling into clutch 16B is completed.

From moment $T_0$ when transmission control unit 12 immediately starts closing clutch 16B at moment $T_1$ when clutch 16B is filled with oil after delay time $T_R$ and is ready to start transmitting a torque, nothing happens to the dynamics of vehicle 1, i.e., the entire engine torque generated by engine 4 is transmitted by clutch 16A as before the start of gear shifting. The opening of clutch 16A is controlled at moment $T_1$; it is worth noting that the opening of clutch 16A associated with current gear A occurs with no delays, as clutch 16A is already filled with oil under pressure and at this step it must only be emptied of part of the oil.

The transfer of torque between the two clutches 16 occurs between moments $T_1$ and $T_2$, i.e., the torque transmitted by clutch 16A gradually decreases and at the same time the torque transmitted by clutch 16B gradually increases, thus causing a crossing between the two clutches 16. Preferably, clutch 16A is opened simultaneously with the complete closure of clutch 16B so as to achieve a symmetric crossing allowing to keep the overall torque transmitted to rear driving wheels 3 (and therefore the torque generated by engine 4) constant. At moment $T_2$, clutch 16A is fully open (therefore no longer transmitting a torque) while clutch 16B is completely closed (therefore transmitting the entire engine torque).

The rotation speed $\omega_E$ of drive shaft 5 of engine 4 is equal to the rotation speed $\omega_A$ imposed by the gear ratio of current gear A before gear shifting, progressively decreases towards the rotation speed $\omega_B$ imposed by the gear ratio of successive gear B during gear shifting, and is equal to the rotation speed $\omega_B$ after gear shifting. As shown in FIG. 3, until moment $T_2$ when clutch 16A is fully open, the rotation speed $\omega_E$ of drive shaft 5 is kept constant and equal to the rotation speed $\omega_A$ and is therefore decreased only after clutch 16A is fully open; such control method of the rotation speed $\omega_E$ of drive shaft 5 aims at preventing clutch 16A from becoming braking, i.e., generating a braking couple to rear driving wheels 3. In order to decrease the rotation speed $\omega_E$ of drive shaft 5 of engine 4 after the complete opening of clutch 16A, control unit 11 of engine 4 temporarily decreases the engine torque generated by engine 4 itself, upon suggestion from control unit 12 of transmission 6; such temporary decrease in the engine torque generated by engine 4 has the effect of decreasing the rotation speed $\omega_E$ of drive shaft 5 which passes from the initial value $\omega_A$ imposed by the gear ratio of current gear A to the final value $\omega_B$ imposed by the gear ratio of successive gear B. In other words, both the mechanical power generated by engine 4 and part of the kinetic energy owned by drive shaft 5 (which slows down as a consequence) are transferred to rear driving wheels 3 for a short period. It is worth noting that the temporary decrease in engine torque $T_E$ generated by engine 4 has no effect on longitudinal acceleration $\alpha$ of vehicle 1, as the torque transmitted by clutch 16B to rear driving wheels 3 remains constant.

Longitudinal acceleration $\alpha$ of vehicle 1 is in first approximation constant and equal to value $\alpha_A$ immediately before gear shifting, gradually decreases towards value $\alpha_B$ during gear shifting, and is in first approximation constant and equal to value $\alpha_B$ immediately after gear shifting. The decrease of longitudinal acceleration $\alpha$ of vehicle 1 during gear shifting is due to the fact that the engine torque generated by engine 4 remaining fairly constant is transmitted with a gradually decreasing gear ratio (gear A is shorter than gear B) and therefore a gradually decreasing torque is applied to rear driving wheels 3.

In the above described gear shifting, it is apparent that between moment $T_0$ in which the driver sends the command of gear shifting and moment $T_1$ in which the driver feels the gear shifting (i.e., feels a decrease in longitudinal acceleration $\alpha$ of vehicle 1) delay time $T_R$ elapses, which is a stand-by period with no action from the perspective of the driver. In order to give the driver the perception of a greater responsiveness of transmission 6 to the command of gear shifting, it is possible to operate as shown in FIGS. 4-6.

Figure 4:
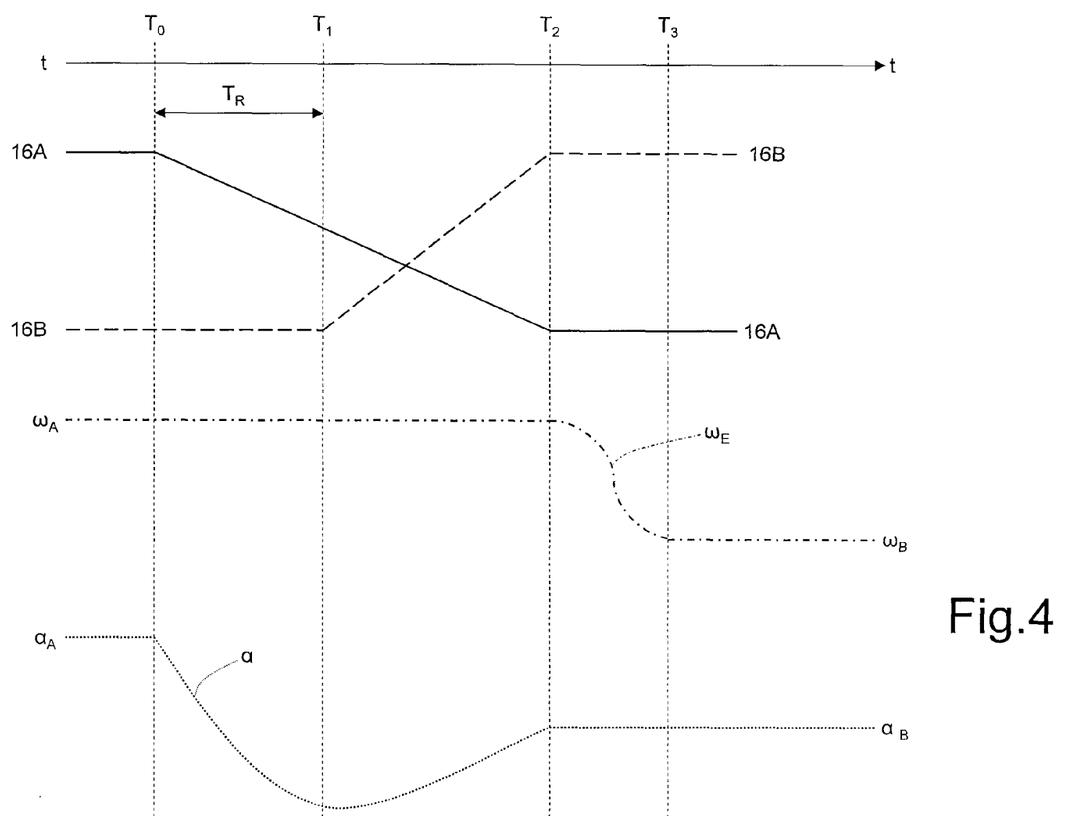
FIGS. 4-7 illustrate the evolution in time of the torques transmitted by the two clutches of the twin-clutch gearbox, the rotation speed of a drive shaft of the engine, and the longitudinal acceleration of the vehicle during several gear shiftings performed according to some examples.
Figure 5:
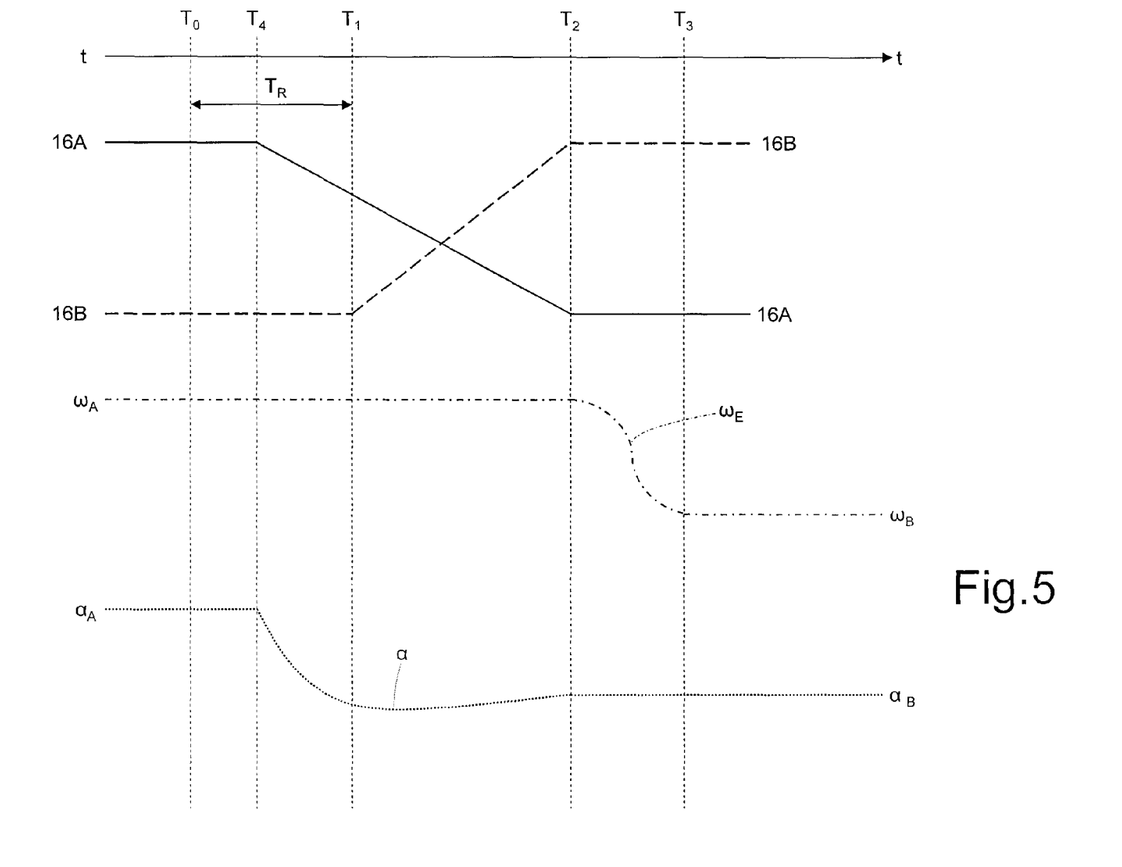
Figure 6:
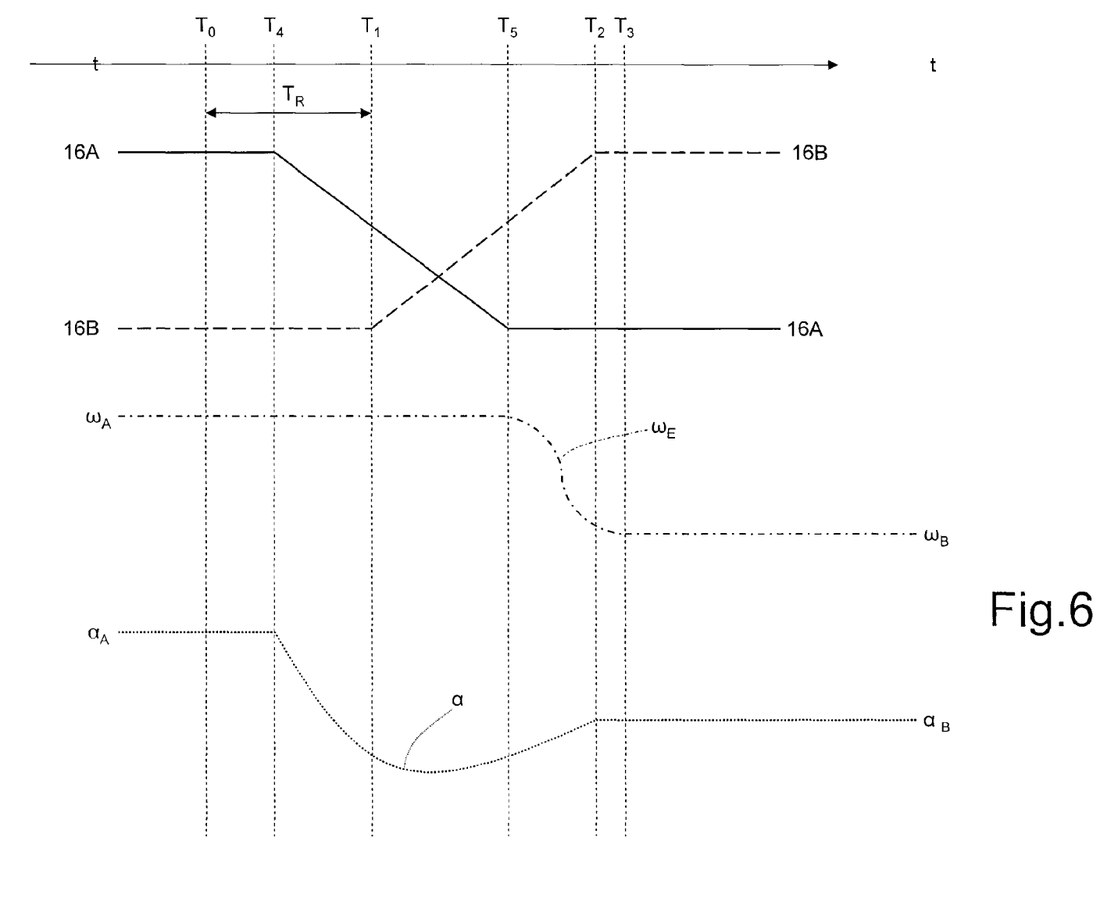

As shown in FIGS. 4-6, the opening of clutch 16A does not start at moment $T_1$, clutch 16B starts transmitting torque, but this occurs earlier than moment $T_1$, i.e., starts before the start of the torque transmission by clutch 16B. The advance in the opening of clutch 16A is variable and may occur as a lower limit at moment $T_0$ (as shown in FIG. 4) or may occur in an moment $T_4$ between moment $T_0$ and moment $T_1$ (as shown in FIGS. 5 and 6). In this manner, the driver feels that transmission 6 responds to his/her command of gear shifting sent at moment $T_0$ in an extremely quick manner (i.e., a short delay time) and even instantaneously when the opening of clutch 16A starts at moment $T_0$ as shown in FIG. 4.

As shown in FIGS. 4 and 5, the opening of clutch 16A is slowed (i.e., is performed more slowly than the maximum speed available), so that the complete opening of clutch 16A occurs at moment $T_2$ when the complete closure of clutch 16B occurs. It is worth noting that there is no high-performance interest in opening clutch 16A quickly (i.e., quicker than clutch 16B may be closed) as clutch 16A may be used for transmitting part of the engine torque generated by engine 4 towards rear driving wheels 3 as long as clutch 16B is not completely closed.

According to an alternative embodiment shown in FIG. 6, clutch 16A may however be opened quicker than clutch 16B so that the complete opening of clutch 16A is made at an moment $T_5$ when clutch 16B is not yet completely closed; normally, moment $T_5$ which ends the opening of clutch 16A is between moment $T_1$ in which the transmission of torque by clutch 16B starts and moment $T_2$ in which the closure of clutch 16B is complete.

As may be apparent in FIGS. 4-6, the rotation speed $\omega_E$ of drive shaft 5 is kept constant and equal to the initial value $\omega_A$ until clutch 16A is not fully open. Specifically, the rotation speed $\omega_E$ of drive shaft 5 can not fall below the initial value $\omega_A$ until clutch 16A is not fully open in order to prevent clutch 16A from becoming braking, i.e., generating a braking torque to rear driving wheels 3. Moreover, it is preferable not to increase the rotation speed $\omega_E$ of drive shaft 5 as the driver expects a decrease in the rotation speed $\omega_E$ during a forward gear shifting; consequently, any temporary increase of the rotation speed $\omega_E$ during the gear shifting would be judged by the driver as an error in the management of the gear shifting (so the driver would negatively judge the performance of transmission 6).

In order to keep the rotation speed $\omega_E$ of drive shaft constant and equal to the initial value $\omega_A$ when the opening of clutch 16A is anticipated, it is necessary to temporarily cut the engine torque generated by engine 4; such cut of the engine torque generated by engine 4 is performed by control unit 11 of engine 4 upon request of control unit 12 of transmission 6 and inevitably leads to a decrease in the temporary longitudinal acceleration $\alpha$ of vehicle 1 well visible in FIGS. 4-6. Specifically, during all the gear shifting, i.e., from starting moment $T_4$ of the opening of clutch 16A corresponding to the current gear A until moment $T_3$ of complete closure of clutch 16B corresponding to successive gear B, control unit 12 of transmission 6 determines a target engine torque $T_{E-TAR}$ of engine 4; control unit 12 of transmission 6 notifies control unit 11 of engine 4 about target engine torque $T_{E-TAR}$ of engine 4 by means of BUS line 13 and/or by means of the dedicated synchronization cable 14, such that control unit 11 of engine 4 controls engine 4 for pursuing target engine torque $T_{E-TAR}$ of engine 4.

The temporary fall in longitudinal acceleration $\alpha$ of vehicle 1 after the advance in opening of clutch 16A is clearly negative from the standpoint of pure performance, but is not as much negative under the perception of the driver, as the average driver used to the sensations transmitted by a conventional single-clutch gearbox is expected to feel a "torque gap" (i.e., an "acceleration gap") during a forward gear shifting followed by an increase of engine torque (i.e., acceleration) at the end of the forward gear shifting. The temporary fall in longitudinal acceleration $\alpha$ of vehicle 1 after the advance in the opening of clutch 16A provides the driver exactly the same perceptions of a traditional single-clutch gearbox (i.e., what is expected by the driver): when the command of forward gear shifting is sent, a "torque gap" (i.e., an "acceleration gap") is felt followed by an increase of the engine torque (i.e., acceleration) at the end of the forward gear shifting. On the contrary, in a standard gear shifting of a twin-clutch gearbox (e.g. shown in FIG. 3), during the forward gear shifting there is only felt a gradual reduction of longitudinal acceleration $\alpha$ of vehicle 1 by effect of a gradual lengthening of the gear ratio of the engine torque generated by engine 4; such gear shifting mode is very positive in terms of performance, but makes the majority of drivers feel exactly the opposite, i.e., is considered as detrimental to the performance.

Moment $T_4$ in which the opening of clutch 16A is started is decided according to how quick you desire to response to the sending of the command of gear shifting, i.e., how quick you desire an action of transmission 6 to be felt by the driver about after sending the command of gear shifting at moment $T_0$. In other words, the greater the perception of responsiveness of transmission 6 to the command of gear shifting desiring to give to the driver, the more moment $T_4$ in which the opening of clutch 16A is started must be more proximate to moment $T_0$.

Moment $T_5$ in which the opening of clutch 16A is ended, is decided according to how much accentuation of the "acceleration gap" is desired during the gear shifting, i.e., how much apparent must be the "acceleration gap" during the gear shifting; the greater the "acceleration gap" during the gear shifting, the greater the growth of longitudinal acceleration $\alpha$ of vehicle 1 at the end of the gear shifting, and therefore the greater the perception for the driver that the engagement of successive gear B resulted in an increase in longitudinal acceleration $\alpha$ of vehicle 1. In other words, the greater must be the "acceleration gap" during the gear shifting, the more moment $T_5$ in which the opening of clutch 16A is ended must be proximate to moment $T_1$ (in exceptional cases, moment $T_5$ could even anticipate moment $T_1$, i.e., the complete opening of clutch 16A could occur before the start of the torque transmission of clutch 16B).

The method of performing the above-described gear shifting was named "SIAMT"; such name stands for "SImulated AMT" and was chosen as the behaviour of a single-clutch gearbox is simulated, at least in part, by means of a twin-clutch gearbox only in order to change the driving perceptions felt by the driver.

According to some examples, control unit 12 of transmission 6 uses an index which allows classification of gear shifting and is called an "AMT Index". For example, when the "AMT Index" is 100%, the gear shifting essentially occurs according to the modes of a single clutch gearbox (therefore, moment $T_4$ coincides with moment $T_0$, and moment $T_5$ coincides with moment $T_1$ or even is in advance on moment $T_1$), while when the "AMT Index" is 0%, the gear shifting occurs according to standard twin-clutch gearbox modes (e.g., as shown in FIG. 3). In other words, "AMT Index" indicates how high is the advance in the opening of clutch 16A, i.e., both how high is the advance of moment $T_4$ with respect to moment $T_1$ and how high is the advance of moment $T_5$ with respect to moment $T_2$.

As mentioned above, the advanced opening of clutch 16A determines a degradation of performance as it obliges to perform a cut of the engine torque generated by engine 4 as much great as the advance; on the contrary, in a standard gear shifting of a twin-clutch gearbox (e.g. shown in FIG. 3) the engine torque generated by engine 4 is always kept constant with no need for cutting. However, the actual degradation of performance determined by the advanced opening of clutch 16A is felt by the driver (in an exactly opposite manner) as a performance increase. In other words, for the majority of the drivers the gear shifting presenting an advance in the opening of clutch 16A is more high-performance, consequently better, than the standard gear shifting. It is worth noting that the opinion expressed by drivers must be taken into full account even if technically incorrect, as the vast majority of drivers buy cars according to their own perceptions and beliefs and not based on objective criteria; in other words, the drivers want to get the most possible pleasure from driving and do not have to win competitions, so they prefer to buy the vehicle which they believe is more "entertaining" and "high-performance" than the vehicle which is actually faster.

As described above, in order to decrease the rotation speed $\omega_E$ of drive shaft 5 of engine 4 after the complete opening of clutch 16A, control unit 11 of engine 4 temporarily decreases the engine torque $T_E$ generated by engine 4 itself upon suggestion from control unit 12 of transmission 6, while maintaining the torque transmitted to the clutch 16B constant; consequently, a difference between engine torque $T_E$ generated by engine 4 and the torque transmitted by clutch 16B (which is higher than engine torque $T_E$ generated by engine 4) is generated, and such difference has the effect of decreasing the rotation speed $\omega_E$ of drive shaft 5 which passes from the initial value $\omega_A$ imposed by the gear ratio of current gear A to the final value $\omega_B$ imposed by the gear ratio of successive gear B. In other words, both the mechanical power generated by engine 4 and part of the kinetic energy owned by drive shaft 5 (which slows down as a consequence) are transferred to rear driving wheels 3 for a short period. It is worth noting that the temporary decrease in engine torque $T_E$ generated by engine 4 has no effect on longitudinal acceleration $\alpha$ of vehicle 1, as the torque transmitted by clutch 16B to rear driving wheels 3 remains constant.

Figure 7:
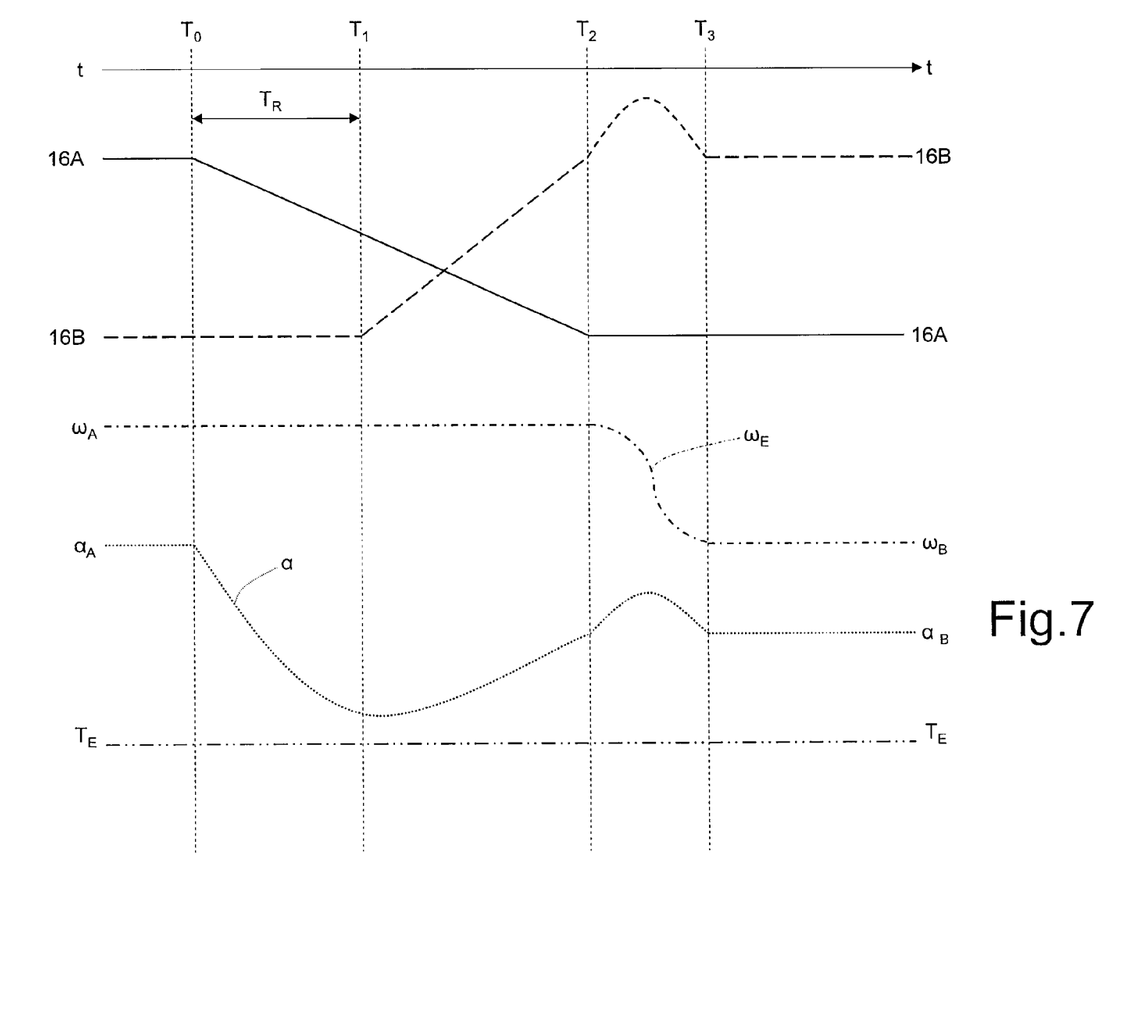

According to the variant shown in FIG. 7, in the high-performance driving (i.e., when the achievement of a high performance in acceleration is desired) in order to decrease the speed of rotation $\omega_E$ of drive shaft 5 of engine 4 after the complete opening of clutch 16A, the engine torque $T_E$ generated by engine 4 is kept constant (usually equal to the maximum engine torque $T_E$ that may be generated by engine 4 in those conditions) and clutch 16B is temporarily overlengthened, thus increasing the oil pressure in order to transfer more torque to rear driving wheels 3. In other words, in the case of high-performance driving for generating a negative differential between the engine torque $T_E$ generated by engine 4 and the torque transmitted by clutch 16B so as to slow down drive shaft 5 instead of decreasing engine torque $T_E$ generated by engine 4 by keeping the torque transmitted by clutch 16B constant, the engine torque $T_E$ generated by engine 4 is kept constant and the torque transmitted by clutch 16B is increased. In other words, clutch 16B is controlled for transmitting to rear driving wheels 3 a higher torque than the engine torque $T_E$ generated by engine 4, which remains constant so as to gradually reduce the rotation speed $\omega_E$ of drive shaft 5 from the initial value $\omega_A$ to the final value $\omega_B$; in this situation, clutch 16B is controlled for transmitting to rear driving wheels 3 both engine torque $T_E$ generated by engine 4, which is (approximately) equal to the maximum engine torque $T_E$ that may be generated by engine 4 in those conditions, and a further (extra) torque generated by the reduction of energy kinetic (which is generated by the slow down of the drive shaft 5) owned by drive shaft 5. As it is apparent in FIG. 7, the above-described mode of temporary overlengthening clutch 16B allows an increase in acceleration performance: between moments $T_2$ and $T_3$ the temporary increase in engine torque transferred to rear driving wheels 3 results in a corresponding temporary increase in longitudinal acceleration $\alpha$.

It is worth noting that the above-described mode of temporary overlengthening clutch 16B allows to increase the performance, but conversely also causes a slight degradation of drive comfort as the increase and successive decrease in longitudinal acceleration $\alpha$ in a reduced time interval (approximately 100-300 milliseconds) resulting in an oscillatory movement of the head of the occupants of the vehicle around the "hinging" of the neck. The backward (when longitudinal acceleration α increases) and forward (when longitudinal acceleration α decreases) movements of the head of the vehicle occupants are perceived as uncomfortable during a high-performance driving. Consequently, the above-described mode of temporary overlengthening clutch 16B is only used when the most possible performance is sought in a sporty driving style.

In order to reduce the loss of comfort introduced by the above-described temporary overlengthening of clutch 16B without however sacrificing all the benefits in terms of performance, it is possible to combine both an overlengthening of clutch 16B for temporarily transmitting more torque to rear driving wheels 3, and a reduction in the engine torque $T_E$ generated by engine 4; in this manner, the step of longitudinal acceleration α of vehicle 1 is reduced (but not entirely eliminated) and is therefore less noticeable by the occupants of vehicle 1. Alternatively, it is possible not to reduce the torque engine $T_E$ generated by engine 4 by increasing the time when clutch 16B is overlengthened; in other words, clutch 16B is overlengthened for transmitting a minor intensity additional torque for a longer time interval, so that the step of longitudinal acceleration α of vehicle 1 is mitigated (but not eliminated) and is therefore less noticeable by the occupants of vehicle 1.

The above-described method of performing the gear shifting relates to a forward gear shifting in which current gear A is shorter than successive gear B. The above-described method of performing the gear shifting may be also applied in a completely equivalent manner to a backward gear shifting in which current gear A is longer than successive gear B; in this situation, the advance in starting the opening of clutch 16A keeps all its utility, while it is not necessary to also anticipate the end of the opening of clutch 16A as vehicle 1 is slowing down and not accelerating during a backward gear shifting.

As mentioned above, each clutch 16 is in an oil bath and is therefore operated in pressure (i.e., the degree of opening/closure of clutch 16 is determined by the pressure oil into clutch 16 itself); in this case, delay time $T_R$ is essentially due to the fact that clutch 16 during the closing must be filled with oil before starting to transmit a torque and therefore is however present. However, in order to increase the "torque gap" (i.e., the "acceleration gap") during the gear shifting, delay time $T_R$ may be deliberately lengthened as compared to real time response times of the hydraulic control system.

Alternatively, each clutch 16 is dry and is operated in position (i.e., the degree of opening/closure of clutch 16 is determined by the position of a mobile part of clutch 16 itself); in this case, delay time $T_R$ imposed by the delays of the mechanical control system is limited and may be deliberately lengthened in order to increase the "torque gap" (i.e., the "acceleration gap") during the gear shifting.

Twin-clutch gearbox 7 comprises a single secondary shaft 17 connected to differential 9 which transmits the motion to rear driving wheels 3; according to an alternative and equivalent embodiment, twin-clutch gearbox comprises two secondary shafts 17 both connected to differential 9.

In conclusion, the above-described control method of shifting gear has many advantages. Firstly, the above-described control method of shifting gear allows to provide the driver with a perception of extreme responsiveness of transmission 6 to the commands of gear shifting and a perception of high performance. Secondly, the above-described control method of shifting gear is of a simple and cost-effective implementation, as it does not require the installation of additional physical components and does not involve an enhancing of control unit 12 of transmission 6 as it does not require significant additional computing power.

We claim:

1. A control method of shifting gear in an automatic manual transmission having a twin-clutch gearbox to pass from a current gear (A) to a successive gear (B); the automatic manual transmission comprising a twin-clutch gearbox presenting two primary shafts, at least a secondary shaft connected to driving wheels and two clutches, each of which is interposed between a drive shaft of an engine and a corresponding primary shaft, the control method comprises the steps of:

establishing, before starting the gear shifting and as a function of the feelings to be given to the driver, how rapidly the reaction to the gear shifting command is to be and also how much to accentuate a "torque interruption", i.e. an "acceleration gap", during the gear shifting;

receiving a gear shifting command at a first moment ($T_0$);

closing at the first moment ($T_0$), a first clutch which is associated to the successive gear (B) and starts transmitting torque at a second moment ($T_1$) after a delay time ($T_R$) interval has elapsed since the beginning of the closure;

opening, at a third moment ($T_4$), a second clutch associated to the current gear (A), which implies decreasing the torque transmitted by the second clutch, before the first clutch starts transmitting torque, so that the second clutch decreases the torque transmitted to the driving wheels before the first clutch starts transmitting torque to the driving wheels;

completing the closure of the first clutch at a fourth moment ($T_2$);

completing the opening of the second clutch at a fifth moment ($T_5$);

establishing the third moment ($T_4$), in which the second clutch starts opening, depending on how rapidly the reaction to the gear shifting command is to be, so that the higher the reaction rapidity is, the closer the third moment ($T_4$), in which the second clutch starts opening, is to a first moment ($T_0$), in which the gear shifting command is received; and including establishing the fifth moment ($T_5$), in which the opening of the second clutch is completed, depending on how much to accentuate an "acceleration gap" during the gear shifting, so that the bigger the "acceleration gap" during the gear shifting is, the more the fifth moment ($T_5$), in which the opening of the second clutch is completed, has to be anticipated with respect to a fourth moment ($T_2$), in which the closure of the first clutch is completed.

2. A control method according to claim 1 and comprising the further steps of:

beginning the closure of the first clutch in the first moment ($T_0$) and filling the first clutch with oil;

starting transmitting torque through the first clutch in the second moment ($T_1$) which is delayed, with respect to the first moment ($T_0$), of the delay time ($T_R$); and beginning the opening of the first clutch in the third moment ($T_4$) which is comprised between the first moment ($T_0$) and the second moment ($T_1$) and is anticipated with respect to the second moment ($T_1$).

3. A control method according to claim 1 and comprising the further step of establishing the third moment ($T_4$), in which the second clutch starts opening, depending on how much one wants to accentuate the "torque interruption" during the gear shifting, so that the bigger the "torque interruption" during the gear shifting is, the more the third moment ($T_4$), in which the second clutch starts opening, has to be anticipated with respect to the second moment ($T_1$), in which the first clutch starts closing.

4. A control method according to claim 1 and comprising the further step of slowing down the opening of the second clutch, so that the fifth moment ($T_5$) in which the complete opening of the second clutch occurs coincides with the fourth moment ($T_2$) in which the complete closure of the first clutch also occurs.

5. A control method according to claim 1 and comprising the further step of anticipating the complete opening of the second clutch with respect to the complete closure of the first clutch, so that the fifth moment ($T_5$) in which the complete opening of the second clutch precedes the fourth moment ($T_2$) in which the closure of the first clutch is completed.

6. A control method according to claim 1 and comprising the further step of keeping the rotation speed ($\omega_E$) of the drive shaft of the engine constant and equal to an initial value ($\omega_A$) imposed by the gear ratio of the current gear (A) until the opening of the second clutch is completed.

7. A control method according to claim 6 and comprising the further step of cutting temporarily the torque delivered by the engine in order to keep the rotation speed ($\omega_E$) of the drive shaft of the engine constant and equal to an initial value ($\omega_A$) until the opening of the second clutch is completed.

8. A control method according to claim 1 and comprising the further steps of:
  finishing the opening of the first gear associated to the current gear (A) and finishing the closure of the first clutch associated to the successive gear (B) in a same closing moment ($T_2$);
  keeping the rotation speed ($\omega_E$) of the drive shaft constant and equal to an initial value ($\omega_A$) imposed by the gear ratio of the current gear (A) until the closing moment ($T_2$) in which the opening of the second clutch is completed;
  decreasing, after the closing moment ($T_2$), the rotation speed ($\omega_E$) of the drive shaft from the initial value ($\omega_A$) imposed by the gear ratio of the current gear (A) to a final value ($\omega_B$) imposed by the gear ratio of the successive gear (B); and
  overlengthening for a limited time frame the first clutch after the closing moment ($T_2$), so that the first clutch temporarily transmits an additional torque, which determines a progressive reduction of the rotation speed ($\omega_E$) of the drive shaft from the initial value ($\omega_A$) to the final value ($\omega_B$).

9. A control method according to claim 1 and comprising the further steps of:
  establishing, before starting the gear shifting, the value of a shifting index, which allows for a classification of the gears shifting and indicates how much earlier the opening of the second clutch occurs and how much earlier the opening of the second clutch occurs; and
  determining, before starting the gear shifting and as a function of the shifting index, how high is the advance of the third moment ($T_4$) with respect to the second moment ($T_1$) and how high is the advance of the fifth moment ($T_5$) with respect to the fourth moment ($T_2$).

10. A control method according to claim 9, wherein:
  at a first end of the shifting index the gear shifting essentially occurs according to the modes of a single clutch gearbox and therefore the third moment ($T_4$) coincide with the first moment ($T_0$), the fifth moment ($T_5$) coincides with the second moment ($T_1$) or even is in advance on the second moment ($T_1$); and
  at a second first end of the shifting index opposite to the first end the gear shifting occurs according to standard twin-clutch gearbox modes and therefore the third moment ($T_4$) coincides with the second moment ($T_1$), and the fifth moment ($T_5$) coincides with the forth moment ($T_2$).

* * * * *